United States Patent [19]
de Baets

[11] Patent Number: 5,513,769
[45] Date of Patent: May 7, 1996

[54] SEAL FOR FIXING BY GLUING FOR AN OPENING MADE IN A METAL SHEET

[75] Inventor: Jacques de Baets, Grand Charmont, France

[73] Assignee: ITW de France, Beauchamp, France

[21] Appl. No.: 266,411

[22] Filed: Jun. 27, 1994

[30] Foreign Application Priority Data

Jul. 5, 1993 [FR] France .................. 93 08199

[51] Int. Cl.⁶ ................................. B65D 41/00
[52] U.S. Cl. ................. 220/359; 220/307; 428/63
[58] Field of Search ................... 220/307, 359; 156/71, 94, 91; 215/305, 355, 364; 428/63

[56] References Cited

U.S. PATENT DOCUMENTS

| 4,094,436 | 6/1978 | Birmingham | 220/307 |
| 4,391,384 | 7/1983 | Moore, III et al. | 220/359 |
| 4,555,284 | 11/1985 | Quella et al. | 156/94 |
| 4,588,105 | 5/1986 | Schmitz et al. | |
| 5,224,624 | 7/1993 | Kraus | |
| 5,267,667 | 12/1993 | Cozzani | |

*Primary Examiner*—Stephen P. Garbe
*Assistant Examiner*—Robin A. Hylton
*Attorney, Agent, or Firm*—Schwartz & Weinrieb

[57] ABSTRACT

In a seal for an opening, a bead of meltable glue (3) is deposited on the top face of the peripheral flange (4), the bottom face of which lies facing the metal sheet (7) about the circumference of the opening (8), holes suitable for the glue to pass through when it melts as a result of the metal sheet being heated, being provided between the top and bottom faces of the peripheral flange, the glue, when cooling, fixing together the metal sheet and the bottom of the peripheral flange.

20 Claims, 2 Drawing Sheets

SEAL FOR FIXING BY GLUING FOR AN OPENING MADE IN A METAL SHEET

FIELD OF THE INVENTION

The invention relates to a seal to be fixed by gluing for an opening made in a metal sheet, notably on a motor car body, in order to close off the opening in a watertight manner.

BACKGROUND OF THE INVENTION

Seals of the foregoing type are already known, wherein such seals have a moulded plastic body with a peripheral flange, the bottom face of which is disposed opposite the top face of the metal sheet and about the circumference of the opening when the body is fitted thereto; and an annular bead of meltable glue of the HOT MELT type deposited on the bottom face of the peripheral flange and designed to melt when the metal sheet is heated after the seal is fitted in the opening, so that, after cooling, the seal is fixed to the metal sheet by gluing or adhesion of the peripheral flange to the circumference of the opening.

These seals generally have locking blades which afford a temporary fixation, the final fixation being afforded by the meltable glue, after heating and cooling of the metal sheet, for example, in order to fix the paint which has just been applied to it.

OBJECT OF THE INVENTION

The present invention aims to improve the quality of the gluing thus obtained, notably with regard to the watertightness which it affords.

SUMMARY OF THE INVENTION

To this end it the present invention proposes a seal to be fixed by gluing for in connection with an opening made in a metal sheet, including:

- a body made from moulded plastic and having a peripheral flange disposed above the top face of the metal sheet and disposed over the circumference of the opening when the body is fitted therein; and
- an annular bead of meltable glue deposited on the peripheral flange and designed to melt when the metal sheet is heated after the seal is fitted in the opening, so that, after cooling, the seal is fixed to the metal sheet by gluing of the peripheral flange to the circumference of the opening;

characterised in that the bead of glue is deposited on the top face of the peripheral flange, the bottom face of which faces the metal sheet, holes suitable for the glue to pass through, when it is melted, being provided between the top and bottom faces of the peripheral flange.

By virtue of these characteristics, the bottom face of the peripheral flange is able to bear directly on the metal sheet around the opening rather than through the bead of glue as with the prior seals, which makes it possible to avoid the melting of the glue causing a change in position of the seal with respect to the metal sheet, and more generally to offer the possibility of obtaining a gluing system having the desired quality.

According to preferred characteristics, the peripheral flange has an annular groove provided so as to be recessed in its bottom face, the holes opening into the groove, the bead of meltable glue having sufficient volume for the groove to be able to be filled with melted glue when the metal sheet is heated.

Since the groove has an annular shape, it makes it possible for there to be glue along the entire flange, without interruption, including when the bottom face of the flange is completely pressed against the metal sheet, the absence of any break in the gluing enabling the seal to be watertight.

According to other preferred characteristics, the seal has a locating surface having a shape matching that of the opening and which is connected transversely on the inside of the bottom face of the peripheral flange.

This locating surface is useful both during fitting, since it affords locating and wedging of the seal within the opening, and during the melting of the glue, which it at least partially prevents from flowing inside the opening.

According to other preferred characteristics, the seal has at least one elastic locking blade suitable for bending in order to pass through the opening and then spring back so as to achieve its locking function.

The seal preferably has several elastic locking blades, which have gripping cants suitable for bearing on the bottom edge of the opening when they spring back, the gripping cants being oriented so that, when each elastic blade springs back, the bottom face of the peripheral flange is pushed towards the metal sheet.

This pushing limits or even prevents any leakages of glue out of the groove, and also promotes the quality of the gluing since the seal and metal sheet remain clamped against each other during cooling, whilst the glue sets.

BRIEF DESCRIPTION OF THE DRAWINGS

The disclosure of the invention will now be continued with a description of one exemplary embodiment, given below for illustration and non-limitatively, with reference to the accompanying drawings, in which like reference characters designate like or corresponding parts throughout the several views, and wherein.

DETAILED DESCRIPTION OF THE ILLUSTRATED EMBODIMENT

Figure 1:
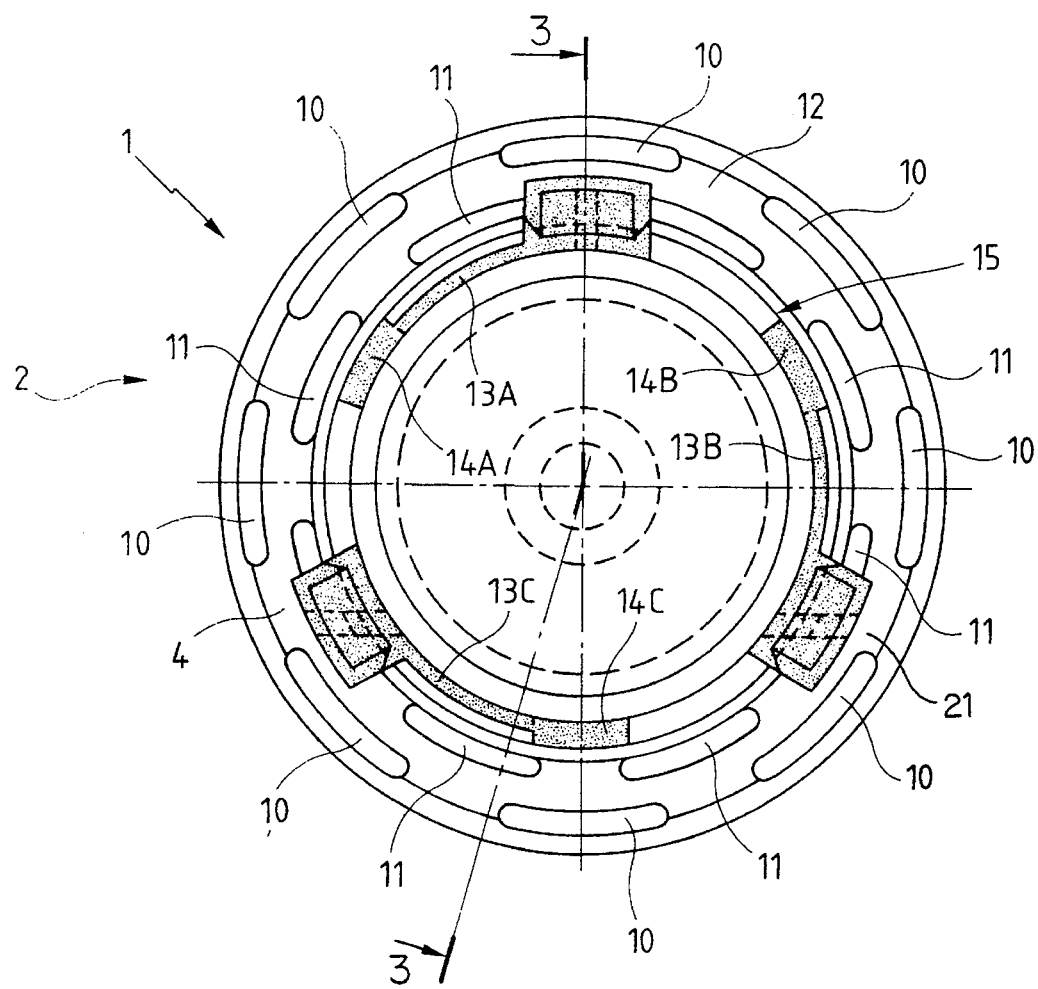
FIGS. 1 and 2 are respectively a view from below and a view in elevation of a seal constructed according to the invention.
Figure 2:
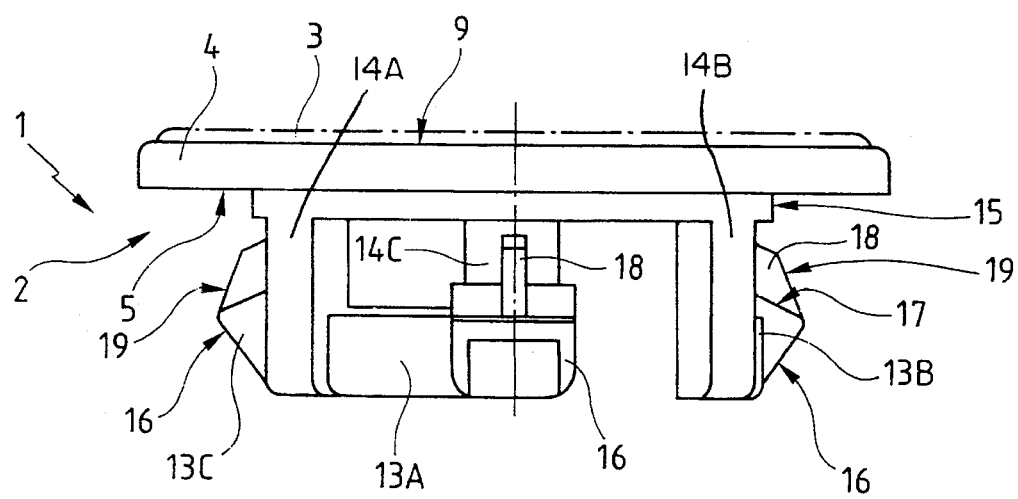

The seal 1 illustrated in the drawings is designed for a circular opening, whose overall shape it adopts.

It has a body 2 made from moulded plastic on which an annular bead 3 of meltable glue is deposited.

Figure 4:
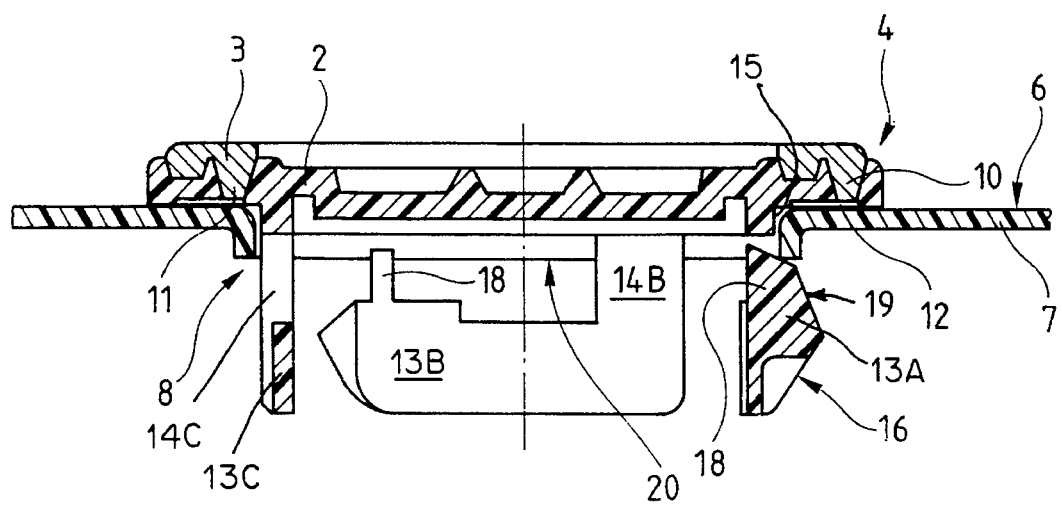
FIG. 4 is a view similar to that of FIG. 3, showing however the seal locked in the opening in the metal sheet.

The body 2 has a peripheral flange 4, the bottom face 5 of which is designed to be disposed above the top face 6 of the metal sheet 7 and about the circumference of the opening 8 which is made therein, when the body 2 is fitted into the opening 8 (see FIG. 4).

The bead of glue 3 is deposited on the top face 9 of the peripheral flange 4, holes 10 and 11 being provided between the top face 9 and bottom face 5.

The peripheral flange 4 also has an annular groove 12 provided so as to be recessed in its bottom face 5, the holes 10 and 11 opening into the groove 12.

A locating surface 15, with a shape matching that of the opening 8, is connected transversely to the inside of the bottom face 5 of the flange 4. The locating surface 15 is the external surface of a barrel formed here by a circular wall and, projecting from this barrel, the body 2 has three lugs 14A, 14B and 14C which extend the circular wall forming the barrel, and at the end of each of these lugs a locking blade 13A, 13B and 13C is connected on the side.

Each of the three elastic locking blades extends, parallel to the peripheral flange 4 and to the positioning surface 15, between its attachment end by which it is connected to the axial lug, and its free end. The end of each blade 13A, 13B or 13C bears on the outside an insertion cant 16 which slopes as far as a step 17 on which is disposed a fin 18, the external surface of which forms a gripping cant 19, in this case with two slopes, the insertion and gripping cants being connected to each other.

In order to fit the seal 1 into the opening 8, it is moved from the same side as the top face 6 with the insertion cants 16 going first, the latter bearing on the wall of the opening when the seal is pushed therein, and, because of their orientation, each causes the locking blade it carries to bend and, when the cants 16 have passed the bottom edge 20 of the opening 8, they spring back with the cants 19 bearing upon the edge 20, the orientation of the cants 19 being such that the springing back of the blades 13A, 13B and 13C causes the seal to move even further into the opening 8, the bottom face 5 of the flange 4 thus being pushed towards the metal sheet 7.

It will be noted that the blades 13A, 13B and 13C are similar, with the exception of the fin 18, to those described in the French patent application 91-12248 filed by the Applicant and to which reference may be made where necessary.

When the metal sheet 7 is heated, after locking the seal 1 therein as shown in FIG. 4, the glue 3 melts and passes through the holes 10 and 11 so as to fill at least the annular groove 12, a little glue possibly leaking towards the outside, by passing under the outermost part of the face 5, and towards the opening 8, the presence of the surface 15, however, limiting the latter leakage.

The aforesaid leakages are however not liable to break the continuity of the glue inside the groove 12, the volume of the bead 3 being appreciably greater than that of this groove.

On cooling, the seal 1 is fixed to the metal sheet 7 by the gluing of at least the peripheral flange 4 to the top face of the metal sheet 7 about the circumference of the opening 8.

Figure 3:
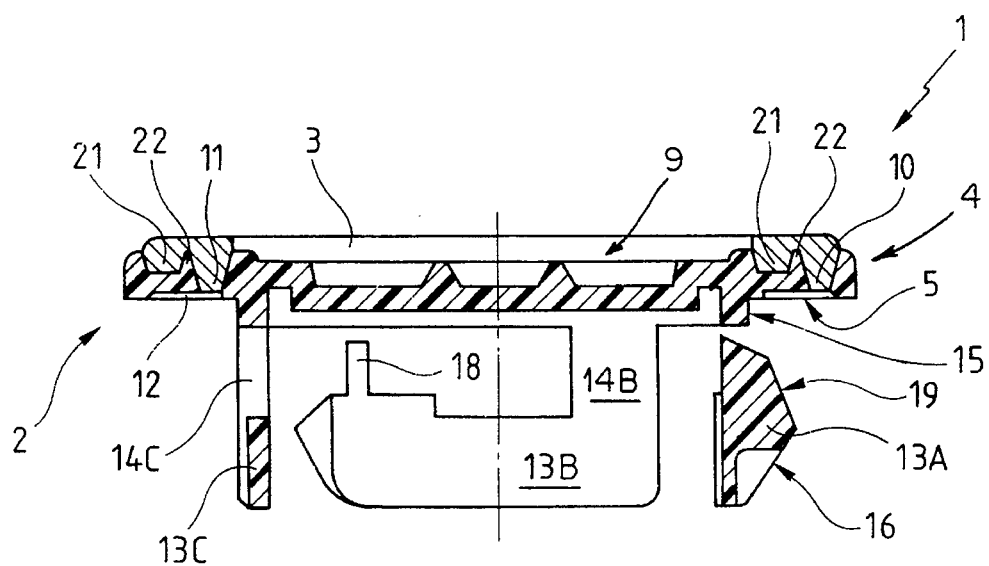
FIG. 3 is a cross-sectional view of the seal of FIG. 1 as taken along the lines 3—3 of FIG. 1.

As can be seen more particularly in FIGS. 3 and 4, the bead 3 is deposited in a channel 21 formed in the top face 9, the holes 10 and 11 being formed in the bottom of the channel 21.

It will be noted that the glue is prevented from leaking through the holes 10 and 11 when it is deposited in the channel 21, because this deposition is effected whilst heating the glue moderately so that it still remains relatively viscous.

To afford good adhesion of the bead, a central lip 22 has been provided in the channel 21, projecting upwardly from its bottom.

The holes 10 and 11 have been given an oblong shape (see FIG. 1) which is particularly well suited to fulfil their function.

Provision has been made here for distributing the holes in two concentric circles, respectively for the holes 10 and for the holes 11, which are disposed in alternation.

In a simplified variant (not illustrated), which also gives very good results, a single row of holes is provided in the channel 21, and the latter does not have the lip 22.

In the example shown in the drawings, the cant 19 cooperates with the underside of a collar which borders the opening 8, but the invention is naturally suited to openings without a collar or with a shape other than circular, and more generally many variants are possible according to circumstances.

In this regard it should also be stated that the invention is not limited to the example described and shown. It is therefore to be understood that within the scope of the appended claims, the present invention may be practiced otherwise than as specifically described herein.

What is new and desired to be protected by Letter Patent of the United States of America is:

1. A seal to be fixed within an opening defined within a sheet, comprising:

a body portion for disposition within said opening defined within said sheet, and a peripheral flange portion for disposition about the circumference of said opening defined within said sheet when said body portion is disposed within said opening defined within said sheet; and meltable glue means for fixedly securing said peripheral flange portion to said sheet as a result of said meltable glue means being melted when said sheet is heated after said body portion is inserted within said opening of said sheet and after said meltable glue means cools and solidifies;

said peripheral flange portion of said seal comprising a first top surface for holding said meltable glue means, a second bottom surface for engaging a top surface of said sheet when said body portion of said seal is disposed within said opening of said sheet, and a plurality of holes defined within said peripheral flange portion and extending between said first top surface of said peripheral flange portion and said second bottom surface of said peripheral flange portion for permitting said meltable glue means to pass therethrough when said meltable glue means has been melted so as to fixedly secure said peripheral flange portion of said seal to said top surface of said sheet.

2. The seal as set forth in claim 1, wherein:

said body portion is fabricated from a plastic material; and said sheet is fabricated from a metal material.

3. The seal as set forth in claim 1, further comprising:

a recessed groove defined within said second bottom surface of said peripheral flange portion for fluidically connecting said second bottom surface of said peripheral flange portion to said plurality of holes extending from said second bottom surface of said peripheral flange portion, through said peripheral flange portion, and to said first top surface and said meltable glue means disposed thereon.

4. The seal as set forth in claim 1, further comprising:

a locating surface integrally formed with and dependent from said peripheral flange portion, and having a configuration which is substantially similar to that of said opening defined within said sheet so as to facilitate proper seating of said seal within said opening defined within said sheet.

5. The seal as set forth in claim 1, wherein:

said body portion comprises at least one locking blade member mounted upon said body portion so as to be movable between a first deflected position as said body portion is inserted into said opening of said sheet so as to permit said body portion to be inserted within said opening of said sheet, and a second normal non-deflected locking position for engaging a bottom surface of said sheet whereby said seal is lockingly retained within said opening of said sheet after said body portion has been properly inserted within said opening of said sheet and said second bottom surface of said peripheral flange portion has been engaged with said top surface of said sheet.

6. The seal as set forth in claim 5, wherein:

said body portion comprises a plurality of locking blade members equiangularly disposed in a circumferential direction about said body portion of said seal.

7. The seal as set forth in claim 6, wherein:

each one of said locking blade members comprises a first angled cant for engaging a first upper peripheral edge portion of said opening so as to move each one of said locking blade members to said first deflected position, and a second, oppositely angled cant for engaging a second lower peripheral edge portion of said opening so as to retain said body portion of said seal within said opening of said sheet and said second bottom surface of said peripheral flange portion engaged with said top surface of said sheet.

8. The seal as set forth in claim 6, wherein:

said plurality of locking blade members are integrally connected to said body of said seal in a cantilevered manner by axially oriented lugs.

9. The seal as set forth in claim 1, further comprising:

an annular channel defined within said top surface of said peripheral flange portion for holding said meltable glue means and fluidically connected to said plurality of holes defined within said peripheral flange portion.

10. The seal as set forth in claim 1, wherein:

said plurality of holes defined within said peripheral flange portion have arcuate configurations.

11. The seal as set forth in claim 1, wherein:

said plurality of holes defined within said peripheral flange portion are circumferentially spaced from each other and are disposed within two concentric circular arrays which are angularly displaced with respect to each other.

12. In combination, a sheet member, and a seal to be fixed within an opening defined within said sheet member, comprising:

a sheet member having an opening defined therein; and a seal member to be fixedly secured within said opening of said sheet member, said seal member comprising a body portion for disposition within said opening defined within said sheet member, and a peripheral flange portion for disposition about the circumference of said opening defined within said sheet member when said body portion is disposed within said opening defined within said sheet member; and meltable glue means for fixedly securing said peripheral flange portion to said sheet member as a result of said meltable glue means being melted when said sheet member is heated after said body portion is inserted within said opening of said sheet member and after said meltable glue means cools and solidifies;

said peripheral flange portion of said seal comprising a first top surface for holding said meltable glue means, a second bottom surface for engaging a top surface of said sheet when said body portion of said seal is disposed within said opening of said sheet member, and a plurality of holes defined within said peripheral flange portion and extending between said first top surface of said peripheral flange portion and said second bottom surface of said peripheral flange portion for permitting said meltable glue means to pass therethrough when said meltable glue means has been melted so as to fixedly secure said peripheral flange portion of said seal to said top surface of said sheet member.

13. The combination as set forth in claim 12, wherein:

said seal member is fabricated from a plastic material; and said sheet member is fabricated from a metal material.

14. The combination as set forth in claim 12, further comprising:

a recessed groove defined within said second bottom surface of said peripheral flange portion of said seal member for fluidically connecting said second bottom surface of said peripheral flange portion of said seal member to said plurality of holes extending between said second bottom surface of said peripheral flange portion and said first top surface of said peripheral flange portion and said meltable glue means disposed thereon.

15. The combination as set forth in claim 12, wherein:

said body portion comprises at least one locking blade member movable between a first deflected position as said body portion is inserted into said opening of said sheet member so as to permit said body portion to be inserted into said opening of said sheet member, and a second normal, non-deflected locking position for engaging a bottom surface portion of said sheet member whereby said seal member is lockingly retained within said opening defined within said sheet member after said body portion has been properly inserted within said opening of said sheet member and said second bottom surface of said peripheral flange portion has been engaged with said top surface of said sheet member.

16. The combination as set forth in claim 15, wherein:

said body portion comprises a plurality of locking blade members equiangularly disposed in a circumferential direction about said body portion of said seal member.

17. The combination as set forth in claim 16, wherein:

each one of said locking blade members comprises a first angled cant for engaging a first upper peripheral edge portion of said opening so as to move each one of said locking blade members to said first deflected position, and a second, oppositely angled cant for engaging a second lower peripheral edge portion of said opening so as to retain said body portion of said seal member within said opening of said sheet member and said second bottom surface of said peripheral flange portion engaged with said top surface of said sheet member.

18. The combination as set forth in claim 16, wherein:

said plurality of locking blade members are integrally connected to said body portion of said seal member in a cantilevered manner by axially oriented lugs.

19. The combination as set forth in claim 12, further comprising:

an annular channel defined within said top surface of said peripheral flange portion of said seal member for holding said meltable glue means and fluidically connected to said plurality of holes defined within said peripheral flange portion.

20. The combination as set forth in claim 12, wherein:

said plurality of holes defined within said peripheral flange portion are circumferentially spaced with respect to each other and are disposed within two concentric circular arrays which are angularly displaced with respect to each other.

\* \* \* \* \*